(12) United States Patent
Wanpen et al.

(10) Patent No.: US 12,307,517 B2
(45) Date of Patent: May 20, 2025

(54) CRYPTOCURRENCY EXCHANGE PLATFORM

(71) Applicant: Bank of America Corporation, Charlotte, NC (US)

(72) Inventors: Napangsiri Wanpen, New York, NY (US); Trish Gillis, Chicago, IL (US); Jennifer Sanctis, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 256 days.

(21) Appl. No.: 17/737,263

(22) Filed: May 5, 2022

(65) Prior Publication Data
US 2023/0360123 A1 Nov. 9, 2023

(51) Int. Cl.
| | | |
|---|---|---|
| *G06Q 40/04* | (2012.01) | |
| *G06Q 20/06* | (2012.01) | |
| *G06Q 20/36* | (2012.01) | |
| *G06Q 20/38* | (2012.01) | |
| *G06Q 20/40* | (2012.01) | |

(52) U.S. Cl.
CPC ........... *G06Q 40/04* (2013.01); *G06Q 20/065* (2013.01); *G06Q 20/3678* (2013.01); *G06Q 20/3821* (2013.01); *G06Q 20/3829* (2013.01); *G06Q 20/4014* (2013.01)

(58) Field of Classification Search
CPC .. G06Q 40/04; G06Q 20/065; G06Q 20/3678; G06Q 20/3821; G06Q 20/3829; G06Q 20/4014
See application file for complete search history.

(56) References Cited

U.S. PATENT DOCUMENTS

| | | | | |
|---|---|---|---|---|
| 2015/0222957 A1* | 8/2015 | Ashbrook | .......... | H04N 21/4135 725/51 |
| 2016/0261411 A1* | 9/2016 | Yau | .................. | G06Q 20/38215 |

FOREIGN PATENT DOCUMENTS

EP 3867849 B1 * 11/2023 ............. G06Q 20/36

OTHER PUBLICATIONS

Cryptocurrency pioneer integrates with leading digital payments platform via new Application Programming Interface (API) gateway to expand real-time transfer services for institutional customers; NASDAQ OMX's News Release Distribution Channel, 2020.*

* cited by examiner

*Primary Examiner* — Ilse I Immanuel
(74) *Attorney, Agent, or Firm* — Weiss & Arons LLP

(57) ABSTRACT

Systems described herein may autogenerate dynamic passwords for cryptocurrency conversion apps that require a password. Protected services provided by a cryptocurrency conversion app may allow access based on the dynamic password. The system described herein may provide authentication rails that link to other apps that require passwords. The described systems may use those special cryptocurrency conversion authentication rails to provide authentication to other apps. The system may include an API for interacting the other apps authenticating users to access protected cryptocurrency conversion services provided by those other apps.

3 Claims, 4 Drawing Sheets

CRYPTOCURRENCY EXCHANGE PLATFORM

FIELD OF TECHNOLOGY

This application describes apparatus and methods for providing secure access to certain digital transaction applications.

BACKGROUND

Mobile applications or "apps" are an ever-present part of our connected lives. Available apps currently provide a wide variety of functions and services from controlling features in a car, music streaming, management of finances, planning of travel, fitness regimes and facilitating social media interactions. Some apps involve digital wallets. Some of these wallets may be leveraged for converting currency to and from cryptocurrency (and/or other digital assets such as an NFT (non-fungible token)).

Cryptocurrency is one of many types of digital assets. It is typically based on information stored in a distributed network. The advantages of cryptocurrency include decentralized systems that survive a collapse at a single, perhaps compromised, location.

Disadvantages of cryptocurrency include price volatility, relatively high energy consumption for mining activities, and use in undesirable activities.

Many apps, including the apps for converting to and from cryptocurrency, require a user to create a profile that will provide a customized experience to the user. It is important that apps that provide access to financial information, such as cryptocurrency conversion apps, must be secured against unauthorized access.

Accordingly, there is a need for a highly secure CRYPTOCURRENCY EXCHANGE PLATFORM.

It would be desirable to provide cryptocurrency conversion utilities.

It would be further desirable to provide enhanced security systems for protecting cryptocurrency conversion utilities.

SUMMARY

An authentication system for controlling secure access to a first protected cryptocurrency conversion application is provided. The system contains an authentication token stored on a mobile device within a digital wallet. A second protected application that runs on the mobile device is secured by a username and password. The system may also contain an application program interface ("API") that detects activation of the first protected cryptocurrency conversion application on the mobile device.

The API may also use credentials associated with the second protected application to access the authentication token stored in the digital wallet and use the authentication token to access a service provided by the first protected cryptocurrency conversion application.

The API may require biometric authentication before using the second protected application to access the authentication token.

In certain embodiments, the API may bypass username and password fields that secure access to the service provided by the first protected cryptocurrency conversion application.

The API may also require that the first protected cryptocurrency conversion application is activated by the second protected application.

In some embodiments, the protected cryptocurrency conversion application may be configured to determine whether, upon providing access to the protected cryptocurrency conversion application, a counterparty to the request for access has input an electronic signal indicating that the counterparty accepts cryptocurrency in order to transact. When the counterparty to the request has input an electronic signal indicating that the counterparty accepts cryptocurrency in order to transact, the protected cryptocurrency conversion application may draw cryptocurrency from an account of the user and execute the electronic communication request in cryptocurrency.

In certain applications, the protected cryptocurrency conversion service may be further configured to determine an amount associated with an electronic communication request to transact in cryptocurrency; to convert an amount of cryptocurrency sufficient to satisfy the amount into an amount of a second currency; and to execute the request to transact in a second currency using the amount of the second currency.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
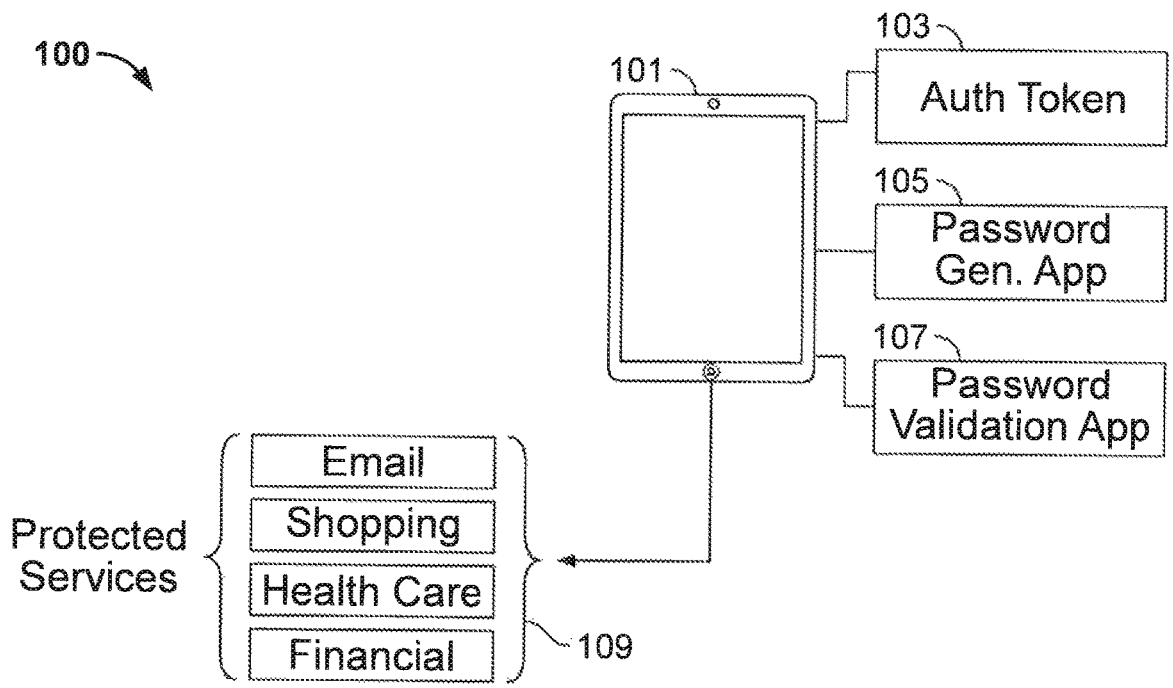
FIG. 1 shows an illustrative system in accordance with principles of the disclosure.

Apparatus for an authentication system that controls secure access to a protected cryptocurrency conversion systems and methods (and/or service(s) involving other digital assets such as, for example, Non-Fungible Tokens (NFTs)) is provided. The authentication system may include, in certain embodiments, an app that is installed on a mobile device. The protected cryptocurrency conversion service may be secured by an independently created password. The system may include an authentication token. The authentication token may be a cryptographic key. The authentication token may be a 128-, 256-, or 512-bit random number.

The authentication token may be a source authentication token represented by a mnemonic word sequence. The mnemonic word sequence makes it easier for a user to transcribe and store the source authentication token. Creation of a mnemonic word sequence may include the following illustrative process. First a random sequence (entropy) of 128 to 256 bits is created. Next, a checksum of the random sequence is calculated by extracting a target number of bits from a SHA256 hash of the random bit sequence.

The checksum is appended to the end of the random sequence. The resulting sequence is divided into segments of 11 bits. Each 11-bit segment is indexed to a dictionary of 2048 predefined words. Finally, 12 to 24 words are selected from the dictionary to represent a mnemonic word sequence corresponding to the source authentication token.

The source authentication token may be a root or source authentication token. The system may include a password generation application. The password generation application may autogenerate a dynamic password for accessing a requested protected service. The password generation application may generate the dynamic password using the source authentication token.

For example, the source authentication token may be used as a seed to generate a password. The source authentication token may be input into a one-way hash function that will generate a new token. The new token will be linked in a sequence to the source authentication token. Multiple passwords or token may be generated. As long as the sequence can be recreated using the original authentication token, all subsequently generated tokens can be regenerated. The ability to dynamically regenerate a sequence of tokens based on a source authentication token facilitates back up, restoring, exporting, and importing thousands or even millions of authentication tokens by transferring only the source authentication token.

The newly minted authentication tokens may not be stored locally on a mobile device. A new token may be deleted after using the new token to access protected services accessible via an app. Such embodiments may include dynamically regenerating at least part of the sequence to generate passwords needed to access protected service provided by a particular app, such as a cryptocurrency conversion app. (or other app. involving another type of digital app.). For example, the password for a target app may be the 15th token in a sequence generated using the source authentication token as a seed.

When a user attempts to access the target app, the system may dynamically generate the needed $15^{th}$ token. The $15^{th}$ token will then be used to access the protected services provided by the app. After the $15^{th}$ token is used to gain access to the app, the system may delete the $15^{th}$ token.

Deleting the $15^{th}$ token may reduce likelihood that the $15^{th}$ token will be intercepted or accessed by a malicious actor. Deleting the $15^{th}$ token may increase security of the app and the ability to dynamically regenerate the $15^{th}$ token as needed does not impose a burden on the user to track and securely store the $15^{th}$ token for future use.

The system may include a password validation application. The password validation application may receive the dynamic password. The password validation application may validate that the dynamic password has been generated using the authentication token as the seed. The password validation application may generate a sequence that includes the nth token needed to access a target app. The password validation application may provide or deny access to the requested protected service based on validating the dynamically generated password.

The password generation application may require a second-factor authentication before autogenerating a dynamic password for the requested protected service. The second-factor authentication may include an input manually provided by a user. Exemplary manual inputs may include a biometric feature, or entry of a one-time password provided to the user in response to receiving a request for the protected service.

The system may include a frontend lock-box application. The frontend lock-box application may store an authentication token. The frontend lock-box application may be a digital wallet. Such a digital wallet may be leveraged to transact in cybercurrency using one of cybercurrency exchanges, online P2P trading, a bitcoin ATM and/or in-person trading.

Cryptocurrency exchanges provide a highly-efficient and relatively secure system and method to trade digital assets. The trades are almost instantaneous, and up-to-date information of trades is available. In addition, there is little chance that a trade sours or goes stale. Furthermore, an exchange user who wants to sell bitcoin probably already have an exchange account that the user used to buy the coins in the first place.

However, exchanges include drawbacks. In order to keep the service running, it charges a trading fee, so it not the cheapest alternative. It may also limit a user to only certain payment methods. Also, there is typically a centralized organization of some kind monitoring the transaction—the exact thing many cryptocurrency users are against. Nevertheless, in the current embodiments, an exchange may be an appropriate back-end for enabling cryptocurrency conversion for as a protected service.

The frontend lock-box application may be installed on a hardware wallet that is not connected to the internet. Such a hardware wallet is designed to be immune to hacking. When the hardware wallet is linked to a mobile device, access to the authentication token stored in the hardware wallet is performed "in-device." Therefore, the authentication token stored in the hardware wallet will not be viewable even if a screen of the mobile is visible while generating the nth token needed to access a secure service.

The frontend lock-box application may be a web-based digital wallet. The authentication token may be stored online and access to the authentication token may be provided via the web-based wallet. The frontend lock-box application may be an app installed on a mobile device.

The digital wallet may link the authentication token to a protected cryptocurrency conversion service (or cryptocurrency exchange). For example, a receiving app that provides access to a requested protected service may interact with the web-based digital wallet to obtain credentials generated based on the authentication token stored within the web-based digital wallet. Based on the credentials generated by the authentication token, the receiving app may determine whether to grant or deny access to the request protected cryptocurrency conversion service.

Access to the digital wallet and the authentication token stored therein may be controlled by the authentication system. The frontend lock-box application may use a biometric feature to access the authentication token. The frontend lock-box application may be compatible with web3 protocols for operation on publicly accessible distributed ledgers. The receiving app that provides the protected service may be a decentralized application operating on the publicly accessible distributed ledger.

A distributed ledger system may include a decentralized and tamperproof database. The tamperproof database may store electronic data records. Records stored on a distributed ledger may gathered into "blocks." A complete copy of the electronic records stored within the database may be stored on multiple computer systems. Each computer system that stores a complete copy of the database may be a "node."

Each record or block of records stored on the distributed ledger may be linked or "chained" (hence the term "blockchain") to another record or block such that a change to the information in any single record triggers a change to all downstream records linked to the changed record. Each record stored within the distributed ledger may include data and metadata. Metadata may include a reference to the previous record in the chain and a unique identifier generated based on metadata in an upstream previous block.

Records may be linked to one another and secured using cryptography. The unique identifier associated with a record may be an output of a hash function. A change of even one letter in a record may result in a different output of the hash function. Thus, for a malicious node to alter a record stored in the distributed ledger, the malicious node would need to change all records that have been, and will be, subsequently linked to the changed record. As will be explained below, a consensus mechanism for changing records stored on a distributed ledger makes such a task unfeasible and therefore the distributed ledger provides tamperproof and auditable storage of records.

A distributed ledger system may include protocols that allow records to be audited by any node. Records stored in a distributed electronic ledger system may only be added to the system when nodes responsible for maintaining records stored in the distributed ledger reach an agreement in accordance with a consensus mechanism in effect for the distributed ledger.

One exemplary consensus mechanism is proof of work. Each node that wises to store a new record in the distributed ledger must successfully solve a computationally intensive task before being authorized to add the new record. The proof of work is typically complex to solve and at the same time easily verifiable by other nodes once completed. This dichotomy ensures that only one node is authorized to add new records and that all other nodes can easily verify that the new records have been properly linked to prior records.

The computationally intensive nature of the proof of work process provides tamperproof and auditable storage of records. It is computationally expensive for a malicious node to modify records and attempt to corrupt contents of records stored on the distributed ledger. Other nodes on the network continuously generate new records, outrunning the malicious node in the process of adding new records to the distributed ledger system. Therefore, a reliable branch of blocks or other repository of records will grow faster than any new records generated by the malicious node. Nodes participating the distributed ledger system are programmed to recognize the largest record repository on the network as the authoritative record source. Nodes will therefore invalidate any smaller repositories created by the malicious node.

In order for a malicious node to successfully add a manipulated record to the distributed ledger system, it would be necessary for the malicious node to solve the proof of work faster than the rest of nodes on distributed ledger system. On a distributed ledger system, this is structured to be computationally too expensive for the malicious node. Accomplishing this feat requires having control of at least 51% of the computing resources in use to maintain the distributed ledger system.

The distributed ledger system may use any suitable consensus mechanism that requires a malicious node to control at least 51% of the computing resources in the distributed ledger system to manipulate a record. Other exemplary consensus mechanisms may include Delegated Proof of Stake, Transaction as Proof of Stake or Delegated Byzantine Fault Tolerance.

The distributed ledger may be a public or nonpermissioned distributed ledger. A public distributed ledger does not have restrictions on nodes that may participate in the process of establishing a consensus for adding a new record or block. The distributed ledger may be a private or permissioned distributed ledger. A private distributed ledger may include restrictions on who may participate in the establishing a consensus for adding a new record or block.

A distributed ledger may utilize a combination of private and public participation to establish a consensus. For example, the distributed ledger may require a threshold number of private and/or public "approvals" before recording a transaction on the distributed ledger. For example, records may only be added to the distributed ledger when nodes that rely on the distributed ledger reach a consensus. Utilization of private entities may allow for achieving a consensus (or rejection) of a transaction faster than wholly public distributed ledgers.

The frontend lock-box application may secure access to the password generation application. The authentication system may include a backend lock-box application. The backend lock-box application may link the requested secure service to the authentication token stored in the frontend lock-box application. The frontend lock-box application may store an authentication token corresponding to a private cryptographic key (preferably unrelated to any cryptographic keys associated with the cryptocurrency conversion application). The private cryptographic key may be used by the password generation app to generate a dynamic password.

A public cryptographic key may be paired to a private cryptographic key. The private cryptographic key may be the authentication token stored in frontend lock-box application. Access to the private cryptographic key may be controlled by frontend lock-box application. The frontend lock-box application may keep the private cryptographic key secret, so it has exclusive access to generate a digital signature based on the private cryptographic key. The backend lock-box application may store a public cryptographic key that is paired to the private cryptographic key and used to validate the dynamic password.

The public cryptographic key may be derived from the private cryptographic key. A mathematical relationship may link the public and the private keys. The mathematical relationship allows the private key to generate digital signatures that can be validated using the public key without revealing the private key. A digital signature may be generated by inputting a message into a hash function. The message may be details of a financial transaction, a username, a randomly generated string, a web address, email, document, picture, or any other type of data.

An output of a hash function (also called a "hash") is a fixed-length string of numbers and letters. The fixed-length string is unique to the message being hashed and is a one-way function—a computed hash cannot be reversed to find other data that may generate the same hash. Illustrative hash functions include Secure Hash Algorithm-1 (SHA-1), the Secure Hashing Algorithm-2 family (SHA-2 and SHA-256), and Message Digest 5 (MD5).

A digital signature may be generated by encrypting the hash using the private cryptographic key stored in the frontend lock-box application. To validate an authenticity of the message, the receiving app that provides the secure service may use the paired public key to decrypt the digital signature. The receiving app then uses the same hashing function that generated the original hash to generate a new one-way hash of the encrypted digital signature. Information about the hashing function used by the sender and the public key may be sent to the receiving app along with the digital signature.

Finally, the receiving app compares the decrypted hash and the newly generated hash. If they are identical, the message is authentic and has been generating using the authentication token. If the hashes do not match, the message may have been tampered with after it was signed, or the digital signature may have been created with a private key that does not correspond to the public key transmitted to the receiving app.

The dynamic password may be a one-time password. For example, each time access to a protected service is requested, a random nth number token may be generated using the source authentication token. The random nth number token may be the message that is input to the message into the hash function to generate a digital signature. The receiving app that provides the request protected service may authenticate the digital signature using a public cryptographic key.

In some embodiments, the frontend lock-box application and the backend lock-box application may each store a local copy of the source authentication token. The authentication system may include a first communication channel. The first communication channel may link the frontend lock-box application to the backend lock-box application. The first communication channel may be utilized to provide the backend lock-box application with which of the nth number token may be generated using the source authentication token is currently being used to access the protected service.

The first communication channel may be encrypted using a first private cryptographic key. The first private cryptographic key may be controlled by the frontend lock-box application. The backend lock-box application may use a first public cryptographic key paired to the first private cryptographic key to decrypt communications received from the frontend lock-box application. The first private cryptographic key may be different from the source authentication token.

The authentication system may include a second communication channel. The second communication channel may link the backend lock-box application to the protected service. The backend lock-box application may utilize the second communication channel to interact with the receiving app that provides the protected service. The backend lock-box application may utilize the second communication channel to inform the receiving app whether the credentials received from the frontend lock-box application have been authenticated and whether the requested protected service may therefore be provided to the requesting user.

The second communication channel may be encrypted using a second private cryptographic key. The second private cryptographic key may be controlled by the backend lock-box application. The receiving app may use a second public cryptographic key paired to the second private cryptographic key to decrypt communications received from the backend lock-box application. The second private cryptographic key may be different from the source authentication token.

A computer executable method for controlling secure access to multiple protected services is provided. One or more computer systems may be configured to perform particular operations or actions by virtue of having computer executable instructions installed on the system that in operation causes or cause the system to perform various functions. Some or all of the computer executable instructions may be embodied in software, firmware, hardware, or a combination thereof.

The computer executable instructions may include one or more smart contracts. A smart contract may be a self-executing computer program that triggers actions at specified times and/or based on reference to the occurrence or non-occurrence of a target action or event. Smart contract may execute in a cloud computing environment that includes virtual software implementations. Smart contract may execute in a distributed ledger environment. Smart contract may trigger actions based on the contents of records stored on the distributed ledger. Such virtual software implementations may be designed to run on physical hardware supplied externally by a hosting provider, a client, or other platform.

The computer executable instructions may invoke user functionality related to communication, such as email, short message service ("SMS"), and voice input and speech recognition applications. The computer-executable instructions may include program modules, executed by a processor on a computing system. Generally, program modules include routines, programs, objects, components, data structures, etc. that perform particular tasks or implement particular abstract data types.

The computer executable instructions may be operational with distributed computing environments where tasks are performed by remote processing devices that are linked through a communications network. In a distributed computing environment, program modules may be located in both local and remote computer storage media including memory storage devices. The computer executable instructions may rely on a network of remote servers hosted on the Internet to store, manage, and process data (e.g., "cloud computing" and/or "fog computing").

The method for controlling secure access to multiple protected services may include extracting computer readable instructions stored on a non-transitory medium and executing the computer readable instructions on a processor. Execution of the computer readable instructions by the processor may detect a request for access to a protected service.

Based on the request, the method may include accessing a webpage hosting the protected service. The method may include identifying a username input field on the webpage. The method may include identifying a password input field on the webpage. In response to identifying the username and password input fields, the method may include triggering activation of a secure application program interface ("API"). The API may be accessible via the webpage.

In response to activation of the secure API, the method may include using the secure API to submit an authentication token to access the requested protected service. The API may be secured using private and public cryptographic keys. The authentication token may request access to the protected service using a target user profile.

The method may include generating dynamic login information. The dynamic login information may be generated using a source authentication token. The source authentication token may be stored in a digital wallet. The dynamic login information may include a digital signature generated using a private cryptographic key. The method may include inputting the dynamic login information into the username and password input fields on the webpage that controls access to the protected service.

Submitting the system generated login information may trigger activation of the secure API. The secure API may provide a communication channel for the digital wallet to communicate with the receiving app that provides the protected service. The secure API may be accessible from the webpage, however, there may not be any visual indication on the webpage that access to the protected service is available via the secure API. The secure API may include one or more smart contracts operating on a distributed ledger.

The computer executable method may include detecting selection of the protected service from within an online-banking portal ("OBP"). The OBP may be accessible via an app operating on a mobile device. The selection of the protected service may generate a request for access to the protected service.

The OBP may be a first app running on the mobile device. A second app may provide access to the protected service using the target user profile. Conventionally, the first and second apps may not be built to communicate or share authentication credentials with each other. The computer executable method may include using an authentication token stored on the first app to access a protected service provided by the second app. The first app may activate the second app using the secure API. The first app may submit the authentication token to the second app using the secure API.

When the second app receives the authentication token via the secure API, the second app may be programmed to access a backend lock-box application to validate the authentication token. For example, the backend lock-box application may validate a dynamic password or digital signature generated based on the authentication token. The first app may require a biometric authentication before activating the secure API and submitting the authentication token to access the protected service using the target user profile.

The computer executable method may include monitoring activity associated with the OBP. The method may include correlating the monitored activity to the protected service. The correlating may provide an additional layer of security that prevents unauthorized access to the protected service.

For example, based on transactions involving cryptocurrency conversion conducted using the OBP, the computer executable method may expect that a user will execute digital transactions with a target range of values. The computer executable method may detect that the request for access to the protected cryptocurrency conversion service involves transactions that are outside the target range of values. In some embodiments, the computer executable method may deny access to the requested protected service that involves the transactions outside the target range of values. In some embodiments, the computer executable method may request a second-factor authentication before requesting access to the requested protected service that involves the transactions outside the target range of values.

An authentication system for controlling secure access to a first protected application is provided. The system may include an authentication token. The authentication token may be stored on a mobile device. The authentication token may be stored on the mobile device within a digital wallet.

The authentication system may include a second protected application. The second protected application may run on the mobile device. Access to the second protected application may be secured by a username and password. The username and password may be authenticated by a remote computer system associated with the second protected application. The username and password may not be accessible by any other apps operating on the mobile device. The username and password may not be capable of providing access to services provided by the first protected application.

The authentication system may include an application program interface ("API"), The API may be, in a first instance, programmed to detect activation of the protected application on the mobile device. After the API is activated, the API may be programmed to use the username and password associated with the second protected application to access the authentication token stored in the digital wallet. The API may then use the authentication token to access a service provided by the first protected application.

Thus, a user only needs to remember and secure the username and password associated with the second protected application. The API may securely manage access to other protected services and application running on the mobile device by using the username and password associated with the second protected application to access the authentication token stored in the digital wallet. The authentication token may then be used to authenticate user access to the other protected services and application running on the mobile device.

In some embodiments, the API may require biometric authentication before using the username and password associated with the second protected application to access the authentication token. In some embodiments, the API may bypass a username and password fields that secure access to a protected service provided by the first protected application. Instead, the API may interact with a smart contract running on a distributed ledger. The smart contract may validate credentials submitted by the API. Credentials submitted by the API may include the authentication token stored in the digital wallet or a digital signature generated based on the authentication token.

In some embodiments, before the API submits credentials to the second protected application, the API may check whether the first protected application has been activated by the second protected application. When the first application has been activated by the second protected application, an entry may be made to a smart contract. The API may check whether the entry is present before accessing the authentication token stored in the digital wallet.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system 100. System 100 includes mobile device 101. Mobile device 101 may include one or more apps for accessing protected services 109. A protected service may include any service that is protected by a username and password. System 100 includes authentication token 103. Authentication token 103 may be used to autogenerate a dynamic password for accessing protected service 109. Protected service 109 (as well as protected service 607 in FIG. 6, and other protected services described herein) may include, inter alia, a cryptocurrency conversion service. An exemplary authentication token may be 12B0aD31f483Cdf4741de8f5679A472E5fe3345G. Authentication token 103 may be securely stored in a digital wallet (not shown).

System 100 includes password generation application 105. password generation application 105 may autogenerate a dynamic password using authentication token 103. For example, password generation application 105 may autogenerate a dynamic password using authentication token 103 as a seed. Password generation application 105 may autogenerate an encrypted digital signature using a public key associated with an app that provides the access to protected service 109. Password generation application 105 may autogenerate an encrypted digital signature using a private key associated with password generation application 105.

The dynamic password generated by password generation application 105 may be validated by password validation app 107. Password validation app 107 may be configured to securely interact with the app that provides access to protected services 109.

Figure 2:
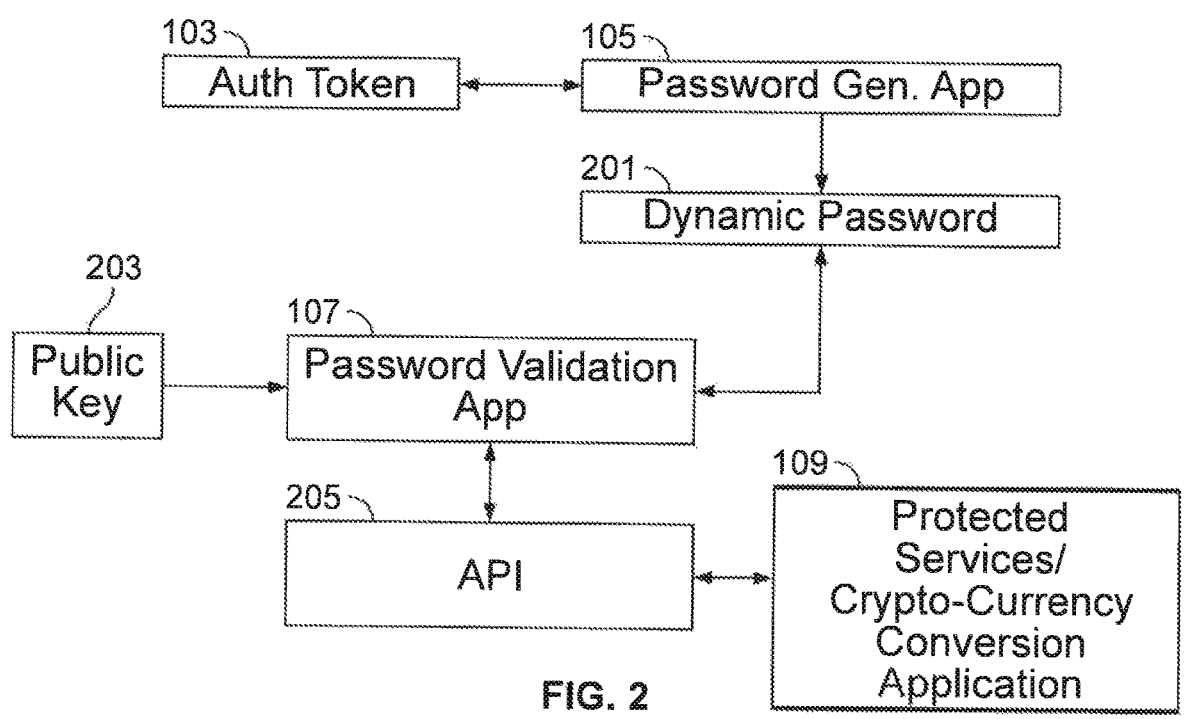
FIG. 2 shows an illustrative system in accordance with principles of the disclosure.

FIG. 2 shows illustrative system 200. System 200 shows that password generation app 105 uses authentication token 105 to generate dynamic password 201. Dynamic password 201 may be different for each access request to protected services 109. Authentication token 103 may be a private cryptographic key. Dynamic password 201 may be a digital signature generated based on the private cryptographic key. A different password for each access request may reduce risk of unauthorized access to protected services 109.

Dynamic password 201 is validated by password validation app 107. Dynamic password validation app 107 may be a standalone app that operates on mobile device 101. Dynamic password validation app 107 may be hosted on a remote computer system. Dynamic password validation app 107 may validate dynamic password 201 using public cryptographic key 203. Dynamic password validation app 107 may use public cryptographic key 203 to verify that a digital signature has been generated using the private cryptographic key corresponding to authentication token 103. A mathematical relationship may link the public and private keys. The mathematical relationship allows the private key to generate digital signatures that can be validated using public key 203 without revealing the private key.

Dynamic password validation app 107 may use API 205 to interact with protected services 109. API 205 may facilitate access to protected services 109 using validation of dynamic password 201 provided by dynamic password validation app 107. API 205 may interact with smart contracts that control access to protected services 109. In some embodiments, the smart contracts may involve cryptocurrency conversion applications. The smart contracts may be programmed to allow access to protected services 109 when dynamic password 201 is validated by dynamic password validation app 107.

Generation and validation of dynamic password 201 may occur automatically, without requiring manual entry of a username and password. Thus, system 200 reduces the number of user credentials (e.g., usernames and passwords) that need to be protected and remembered by a user and prevents unauthorized access to protected services 109.

Figure 3:
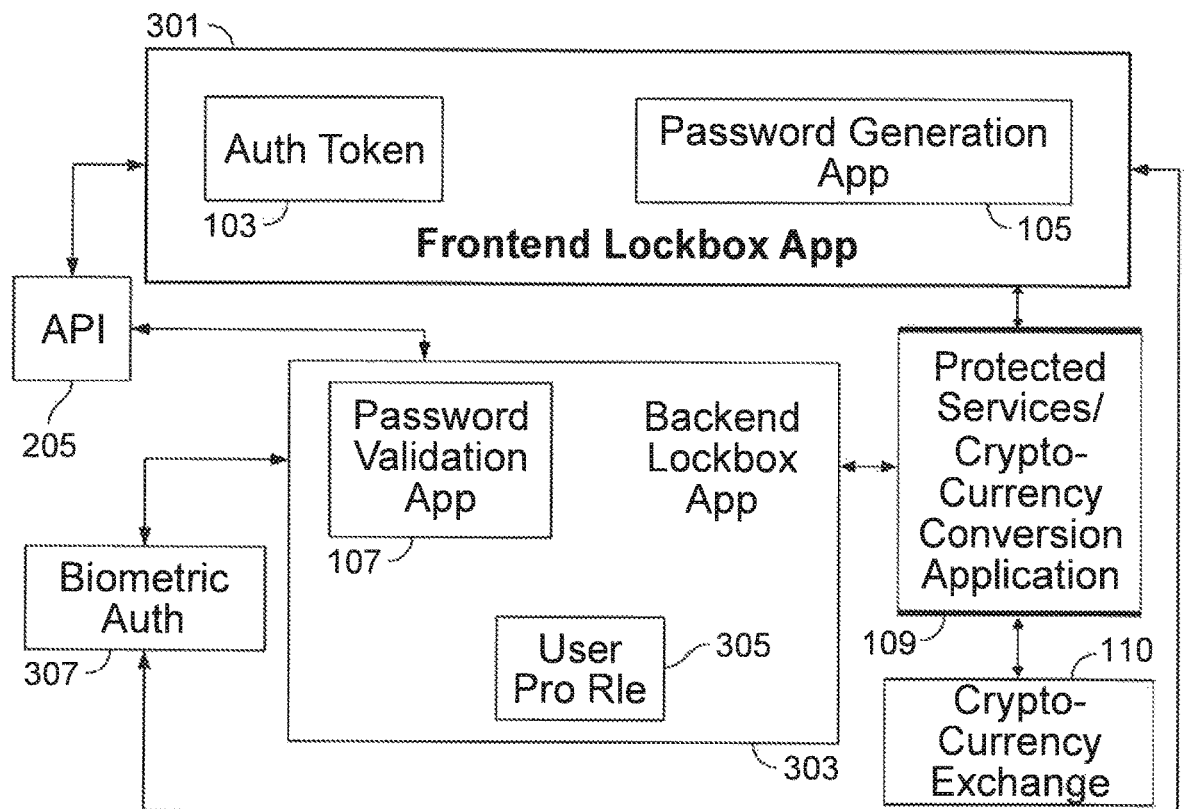
FIG. 3 shows an illustrative system in accordance with principles of the disclosure.

FIG. 3 shows illustrative system 300. System 300 includes frontend lock-box app 301. Frontend lock-box app 301 secures access to authentication token 103 and password generation app 301. Frontend lock-box app 301 may be included in a secure OBP app installed on mobile device 101.

Access to frontend lock-box app 301 may be secured by biometric authentication 307. Biometric authentication 307 may include native biometric authentication processes operating on mobile device 101. Illustrative biometric authentication 307 may include facial recognition, iris or retina recognition or fingerprint recognition.

System 300 includes backend lock-box app 303. Backend lock-box app 303 may include password validation app 107. Via API 205, backend lock-box app 303 may receive dynamic password 201 from frontend lock-box app 301. Backend lock-box app 303 may utilize password validation app 107 to validate dynamic password 201. When dynamic password 201 is successfully validated by password validation app 107, backend lock-box app 303 may activate protected services 109 using user profile 305. In certain embodiments, protected services 109 may include a cryptocurrency conversion application. Furthermore—the cryptocurrency conversion application may be in electronic communication with a crypto-currency exchange 110. As an additional security precaution, backend lock-box app 303 may require biometric authentication 307.

Activating protected services 109 using user profile 305 may include activating an app running on mobile device 101 that provides access to protected services 109 using user profile 305. In some embodiments, access to protected services 109 using user profile 305 may be provide via frontend lock-box app 301.

Figure 4:
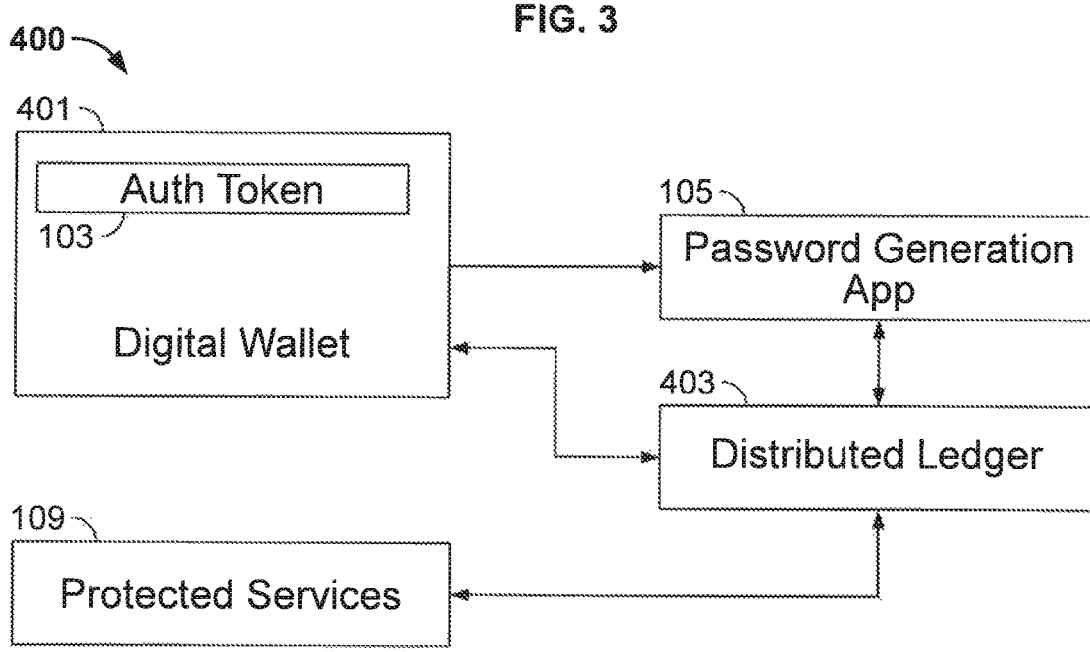
FIG. 4 shows an illustrative system in accordance with principles of the disclosure.

FIG. 4 shows illustrative system 400. System 400 includes digital wallet 401. Authentication token 103 is stored in digital wallet 401. Digital wallet 401 is linked to protected services 109 via distributed ledger 403.

A smart contract running on distributed ledger 403 may automatically validate credentials provided by password generation app 105. For example, the smart contracts may automatically determine whether a digital signature provided by password generation app 105 is associated with user profile 305 that is authorized to access protected services 109.

Protected services 109 may also initiate a request to digital wallet 401 for credentials. For example, a user may activate an app on mobile device 101 for accessing one or more of protected services 109. Before providing access to the requested services, a request for authorization credentials may be submitted to digital wallet 401. Digital wallet 401 may be a web-based wallet that is linked to one or more of protected services 109.

In response to the request received from the app that provides access to protected services 109, digital wallet 401 may interact with password generation app 105 to generate credentials using authentication token 103. The generated credentials may then be validated using a smart contract, which may involve cryptocurrency conversion applications, running on distributed ledger 403.

Figure 5:
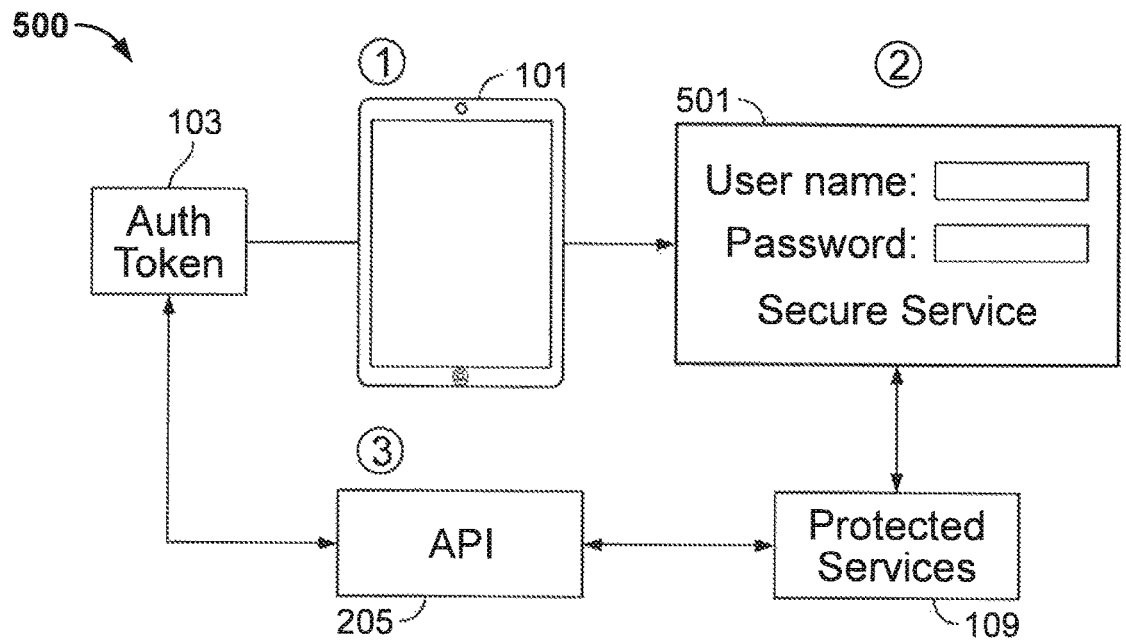
FIG. 5 shows an illustrative process in accordance with principles of the disclosure.

FIG. 5 shows illustrative process 500. Process 500 shows that at step 1, mobile device 101 has requested access to protected services 109. At step 2, in response to the request for access, webpage 501 is presented. Webpage 501 requires entry of a username and password to access the requested protected services 109. Conventionally, a user would need to enter a username and password associated with the requested protected services 109.

However, process 500 shows that at step 3, in response to detecting webpage 501, API 205 uses authentication token 103 to bypass webpage 501 and the conventional requirement to enter a username and password to access the requested protected services 109. API 205 may automatically access authentication token 103 without requiring any manual entry of the username and password associated with the requested protected services 109. In some embodiments, if an app that stores authentication token 103 is already active on mobile device, after detecting the request for access to the requested protected services 109, no manual entry of user inputs may be required to authenticate access to protected services 109.

Figure 6:
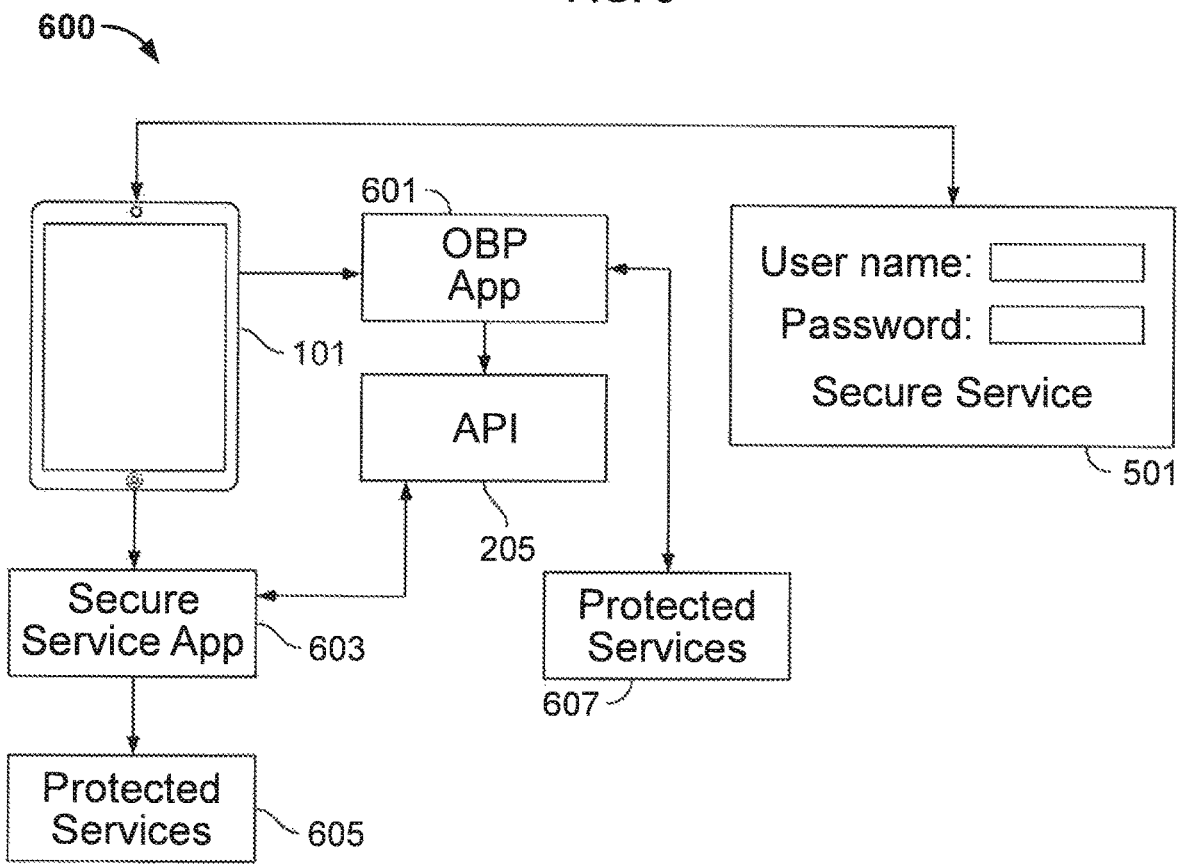
FIG. 6 shows illustrative system in accordance with principles of the disclosure.

FIG. 6 shows illustrative system 600. System 600 includes OBP app 601. OBP app 601 may require a username and password to access protected service 607 via OBP app 601. OBP app 601 may require two or more levels of authentication before allowing access to protected service 607 from mobile device 101.

Mobile device 101 may also include secure service app 603. Secure service app 603 may also provide a portal for accessing protected service 605. Conventionally, a user of mobile device 101 would need to have a distinct set of authorization credentials via login screen 501 to access protected service 605.

System 600 shows that access to protected service 605 may be controlled by OBP app 601 and the credentials that authorize access to protected service 607. API 205 detects activation of secure service app 603 on mobile device 101. API 205 requests that OBP app 601 generate credentials for accessing protected service 605. OBP app 601 may generate credentials for accessing protected service 605 using systems and methods described above in connection with FIGS. 1-5 or described herein.

API 205 may interact with secure service app 603. For example, API 205 may provide secure service app 603 with the credentials for accessing protected service 605 generated by OBP app 601. In such embodiments, secure service app 603 may authenticate the credentials generated by OBP app 601. In other embodiments, API 205 may authenticate the credentials generated by OBP app 601. For example, API 205 may interact with a smart contract operating on distributed ledger 403 (shown above in FIG. 4). The smart contracts may inform secure service app 603 whether the credentials generated by OBP app 601 have been successfully validated.

After successfully confirming that that the credentials generated by OBP app 601 are valid, secure service app 603 may allow access to protected service 605 via mobile device 101.

Thus, using the credentials generated by OBP app 601, a user may be provided access to protected service 605 without having to enter specific credentials specific to secure service app 603 or protected service 605.

Figure 7:
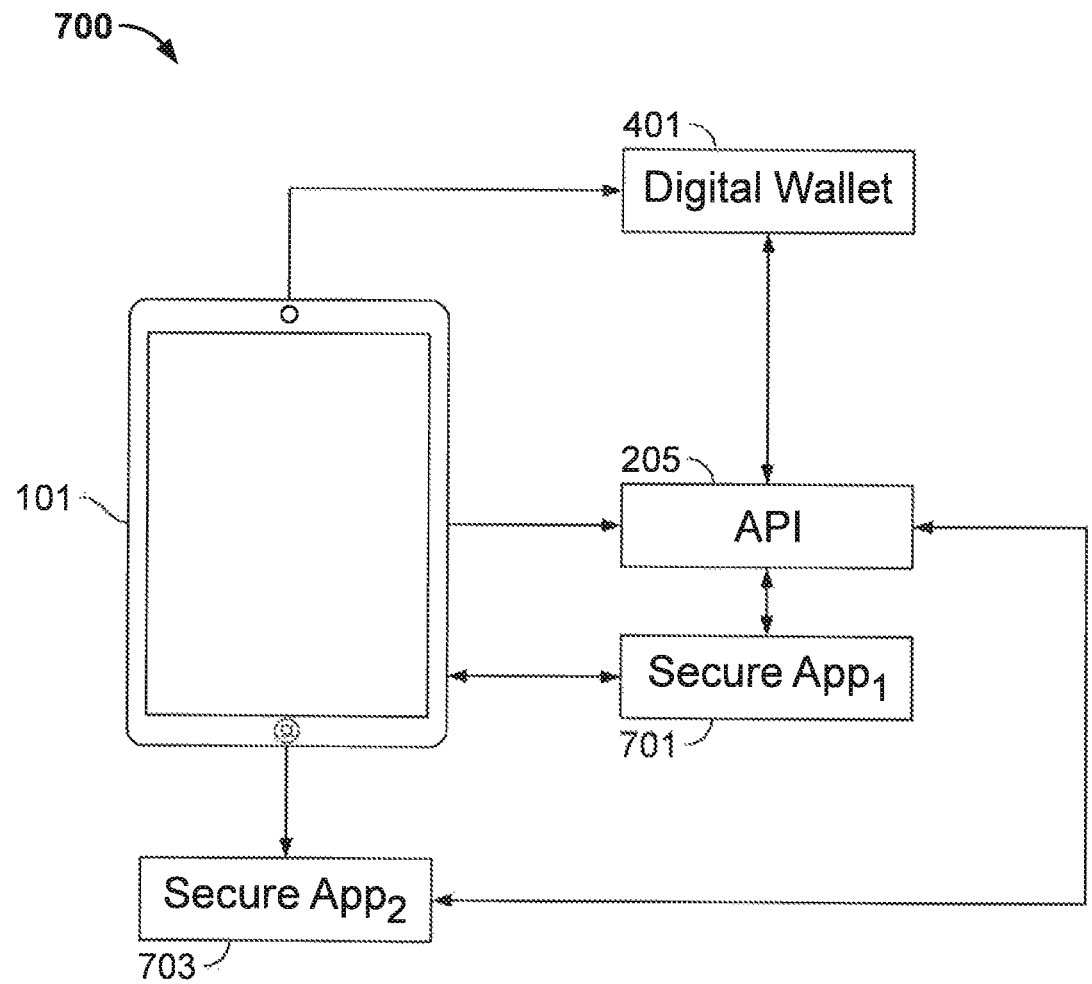
FIG. 7 shows illustrative system in accordance with principles of the disclosure.

FIG. 7 shows illustrative system 700. System 700 includes mobile device 101. Secure app$_1$ (701) and secure app$_2$ (703) each provide access to protective services via mobile device 101. Secure app$_1$ (701) and secure app$_2$ (703) may each provide access to different protective services. For example, secure app$_1$ (701) may provide access to an email account. Secure app$_2$ (703) may provide access to a social media account.

System 700 shows that API 205 may utilize credentials stored in digital wallet 401 to access protective services provided by secure app$_1$ (701) and secure app$_2$ (703). Thus, a user of mobile device 101 does not need to secure and present distinct credentials to access the protective service provided by secure app$_1$ (701) and secure app$_2$ (703). The user only needs to secure credentials needed to access API 205.

Thus, apparatus and methods for a CRYPTOCURRENCY CONVERSION PLATFORM are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A computer executable method for controlling secure access to multiple protected services, said protected services comprise a protected cryptocurrency conversion service, the method comprising extracting computer readable instructions stored on a non-transitory medium and executing the computer readable instructions on a processor, wherein execution of the computer readable instructions by the processor:
   detects a selection of the protected cryptocurrency conversion service from within an online portal running on a mobile device;
   detects a request for access to the protected cryptocurrency conversion service, the protected cryptocurrency conversion service for establishing an electronically executable communication connection with a cryptocurrency conversion exchange;
   based on the request, accesses a webpage hosting the protected cryptocurrency conversion service;
   identifies a username input field and a password input field on the webpage;
   in response to identifying the username and password input fields, triggers activation of a secure application program interface ("API") accessible via the webpage that detects an activation of the protected cryptocurrency conversion service on the mobile device;
   obtains, at the secure API, biometric authentication before using a second protected application, wherein, once the biometric authentication is obtained, the secure API accesses an authentication token, said authentication token stored in a digital wallet;
   bypasses, using the secure API, the username field and the password field that secure access to a service provided by a first protected cryptocurrency conversion application, wherein the service provided is the protected cryptocurrency conversion service;
   activates, using the second protected application, the first protected cryptocurrency conversion application;
   automatically validates, using a smart contract running on a distributed ledger, credentials provided by a password generation application, wherein: the credentials comprise a digital signature, said digital signature provided by the password generation application; and the smart contract automatically determines that the digital signature is associated with a user profile that is authorized to access protected services;
   generates, using said password generation application, a dynamic password using the authentication token, wherein the dynamic password is different for each access request to the protected cryptocurrency conversion service;
   validates, using a password validation application, the dynamic password, the password validation application uses the secure API to interact with the smart contract that controls access to the protected cryptocurrency conversion service; and
   in response to validating the dynamic password with the password validation application, the smart contract contains programming that allows access to the protected cryptocurrency conversion service.

2. The computer executable method of claim 1 wherein execution of the computer readable instructions: monitors activity associated with the online portal; and correlates the activity to the protected service, said protected service comprising the protected cryptocurrency conversion service.

3. The computer executable method of claim 2 wherein execution of the computer readable instructions rejects the request for access to the protected cryptocurrency conversion service based on the activity associated with the online portal.

* * * * *